United States Patent [19]
Pettersson

[11] Patent Number: 6,152,252
[45] Date of Patent: Nov. 28, 2000

[54] DEVICE FOR A VEHICLE

[75] Inventor: Niklas Pettersson, Stockholm, Sweden

[73] Assignee: Scania CV Aktiebolag, Sweden

[21] Appl. No.: 09/202,485

[22] PCT Filed: Apr. 16, 1998

[86] PCT No.: PCT/SE98/00693

§ 371 Date: Dec. 16, 1998

§ 102(e) Date: Dec. 16, 1998

[87] PCT Pub. No.: WO98/47733

PCT Pub. Date: Oct. 29, 1998

[51] Int. Cl.[7] .................................................. B60K 28/12
[52] U.S. Cl. .................................. 180/282; 280/124.106; 188/112 A; 303/123
[58] Field of Search ............................ 180/282, 41, 172, 180/285; 280/5.5, 124.103, 124.104, 124.106, DIG. 14, 432; 188/112 R, 112 A; 303/9.69, 123

[56] References Cited

U.S. PATENT DOCUMENTS

| | | | |
|---|---|---|---|
| 3,886,339 | 5/1975 | Jubenville et al. | 200/61.45 |
| 3,897,979 | 8/1975 | Vangalis et al. | 303/24 |
| 3,908,782 | 9/1975 | Lang et al. | 180/103 |
| 4,898,431 | 2/1990 | Karnopp et al. | 303/100 |
| 4,975,849 | 12/1990 | Ema | 364/424.05 |
| 5,188,434 | 2/1993 | Ruf et al. | 303/111 |
| 5,667,286 | 9/1997 | Hoying et al. | 303/140 |
| 5,700,073 | 12/1997 | Hiwatashi et al. | 303/146 |
| 5,720,533 | 2/1998 | Pastor et al. | 303/147 |
| 5,727,853 | 3/1998 | Monzaki | 303/140 |
| 5,738,420 | 4/1998 | Kawaguchi et al. | 303/146 |
| 5,822,709 | 10/1998 | Fujita | 701/70 |
| 5,869,943 | 2/1999 | Nakashima et al. | 318/586 |
| 6,000,765 | 12/1999 | Hinz et al. | 303/148 |

*Primary Examiner*—Brian L. Johnson
*Assistant Examiner*—Bryan Fischmann
*Attorney, Agent, or Firm*—Ostrolenk, Faber, Gerb & Soffen, LLP

[57] ABSTRACT

To control the tilt of a multi-axle vehicle, a first detector detects the vehicle tilt and sends a signal to a control unit for causing selected vehicle speed reduction for controlling the tilt. To control the direction of the vehicle, another sensor detects the actual course of the vehicle, compares that with a desired course and sends a signal to the control unit also for causing a selected vehicle speed reduction device at the wheels for restoring the course of the vehicle. The signals for tilt and direction may be superimposed for setting the speed reduction on the wheels.

15 Claims, 3 Drawing Sheets

DEVICE FOR A VEHICLE

The invention relates to a device for a vehicle for adjusting tilt of the vehicle and also possibly the course or direction of the vehicle by controlling the vehicle speed at the vehicle wheels.

STATE OF THE ART

Particularly in long and tall vehicles such as short-distance and long-distance trucks and buses there is risk of tilting, i.e. of the vehicle overturning. This risk may arise if its speed is too high when cornering. Such tilting is of course a major traffic hazard not only for persons travelling in the vehicle but also for other vehicles in the vicinity of a tilting vehicle. The problem is still greater if the vehicle concerned is carrying dangerous goods, e.g. those liable to fire hazard.

For a variety of reasons there is sometimes also risk of a vehicle deviating from its course, i.e. of its actual direction of movement deviating from the intended direction, such as that direction determined by the deflection of the steering wheel. U.S. Pat. No. 4,898,431 refers to a brake control system for preventing a vehicle from deviating from its course in this way. This known system includes a first sensor which detects an intended yaw rate of the vehicle and a second sensor which detects its actual yaw rate. The system also includes a control unit arranged to identify a state of deviation from course by comparing the detected actual yaw rate with the intended yaw rate. To prevent the vehicle from deviating from a notional course, the control unit is also arranged to activate the various wheel brakes in response to that comparison, i.e. to adjust the braking force applied to each individual wheel brake according to the situation at the time. This known technique thus only corrects for deviation between an intended and an actual course and gives no indication of how the abovementioned tilt risk may be reduced.

It should also be noted that there is a connection between the risk of tilting and the risk of deviation from course, e.g. in that an attempt to prevent tilting may put the vehicle into a state of deviating from its course.

OBJECT OF THE INVENTION

The object of the present invention is to provide a device with which vehicle tilt can be counteracted. A further aim is that the device should enhance the possibility of making the vehicle maintain the intended course.

This object is achieved with the device mentioned in the introduction, which detects the tilt of the vehicle and controls the tilt by acting on speed reduction devices at the wheels of the vehicle and which may also detect and then control the actual course of the vehicle with respect to its desired course by controlling the speed reduction at wheels at least at one an axle. In particular, with respect to the tilt of the vehicle, a parameter is measured that is transverse to the longitudinal direction of the vehicle and in the vertical direction, which determines vehicle tilt. With such a device it is possible to detect whether the vehicle is tending to tilt and thereupon automatically to reduce the vehicle's speed, e.g. by activating its wheel brakes, an exhaust brake arranged in the vehicle, a so-called retarder, the vehicle's engine brake etc.

According to one embodiment of the invention, the vehicle incorporates at least two wheel axles, each of them with two wheels, and the control unit is arranged to activate the abovementioned device in such a way that a first substantially equal speed-reducing force is applied to each wheel on a wheel axle in response to the value of the parameter monitored. A braking force applied because of the risk of tilting will thus not in itself affect the vehicle's course. Means may also be arranged to determine whether the vehicle is deviating from its course and the control unit may be arranged to activate the aforesaid means of speed reduction in response to a detected deviation. This feature also makes it possible to have the control unit emit to the vehicle's means of speed reduction signals which take into account both the risk of tilting and the risk of deviation from course, in which case the control unit may be arranged to activate said means of speed reduction in such a way that a second speed-reducing force is applied non-uniformly to the wheels on a wheel axle in response to a detected deviation from course.

According to a further embodiment of the invention, the control unit is arranged to activate said means of speed reduction in such a way that the second speed-reducing force is applied non-uniformly in response to a detected deviation from course if the parameter monitored exceeds a predetermined value. This makes it possible for the vehicle to be controlled in such a way that if the parameter monitored has a low value, i.e. the vehicle leans only a little or not at all, a larger deviation from course may be permissible than if the parameter monitored has a high value and the vehicle leans considerably. If the vehicle leans considerably, it is important to be able to brake it non-uniformly upon the slightest tendency to deviation from course, while at the same time it is of course desirable to avoid non-uniform braking upon the slightest small deviation from course if the vehicle is not leaning.

According to a further embodiment of the invention, the control unit is arranged to activate said means of speed reduction so that the second speed-reducing force is super-imposed on the first. In practice, such a non-uniform speed-reducing force may mean that a detected state of deviation from course results in the vehicle being braked on only one side.

According to a further embodiment of the invention, the means of detecting a state of deviation from course comprise a first sensor arranged to detect an intended course of the vehicle and a second sensor arranged to detect its actual course, and the control unit is arranged to identify a state of deviation from course by comparing the detected actual course of the vehicle with its intended course. The first sensor may, for example, be arranged to detect the deflection of the steering wheel, while the second sensor may, for example, be arranged to detect the yaw rate or lateral acceleration of the vehicle.

According to a further embodiment of the invention, the control unit is arranged to activate said means of speed reduction if the value of the parameter monitored exceeds a certain level. Such means of speed reduction may with advantage include a braking device for each wheel. This makes it possible, if the vehicle leans further than a predetermined angle of inclination, to brake the vehicle automatically, preferably uniformly on both sides.

According to a further embodiment of the invention, the control unit incorporates a processor unit arranged to emit a first signal in response to the first force and a second signal in response to the second force, and a distribution unit arranged to activate each braking device in response to these first and second signals. In this case, the distribution unit may be arranged to activate the braking device of a wheel axle on one side of the vehicle with the first force plus half of the second force and to activate the same wheel axle's other braking device on the other side of the vehicle with the first force minus half of the second force.

According to a further embodiment of the invention, the detection device is arranged to detect the difference, as said parameter monitored, between the ground pressure on two wheels which are arranged on the same wheel axle, each on its respective side of the vehicle. Such a detection device may include two pressure detectors each arranged to detect the pressure in its respective suspension element on the vehicle's rearmost wheel axle. Another type of detection device may include a distance measuring element arranged to determine the angle between a direction transverse to the longitudinal and the centerline of a wheel axle, as said parameter. Such angle determination may, for example, be by measurement of a suspension position or the distance between the wheel axle and the framework. The detection device may with advantage be arranged to detect said parameter with respect to the vehicle's rearmost wheel axle.

In one advantageous application of the invention, the vehicle incorporates a tractor vehicle and a trailer, in which case the detection device may be arranged to detect said parameter with respect to the tractor vehicle's rearmost wheel axle. In this way, all necessary components of the device according to the invention may be arranged in the tractor vehicle, thereby making it possible for the device to be used irrespective of the particular trailer coupled to the tractor vehicle at the time.

BRIEF DESCRIPTION OF THE DRAWINGS

The present invention will now be explained in more detail on the basis of various embodiments described as examples with reference to the attached drawings, in which.

DESCRIPTION OF VARIOUS EMBODIMENTS

Figure 1:
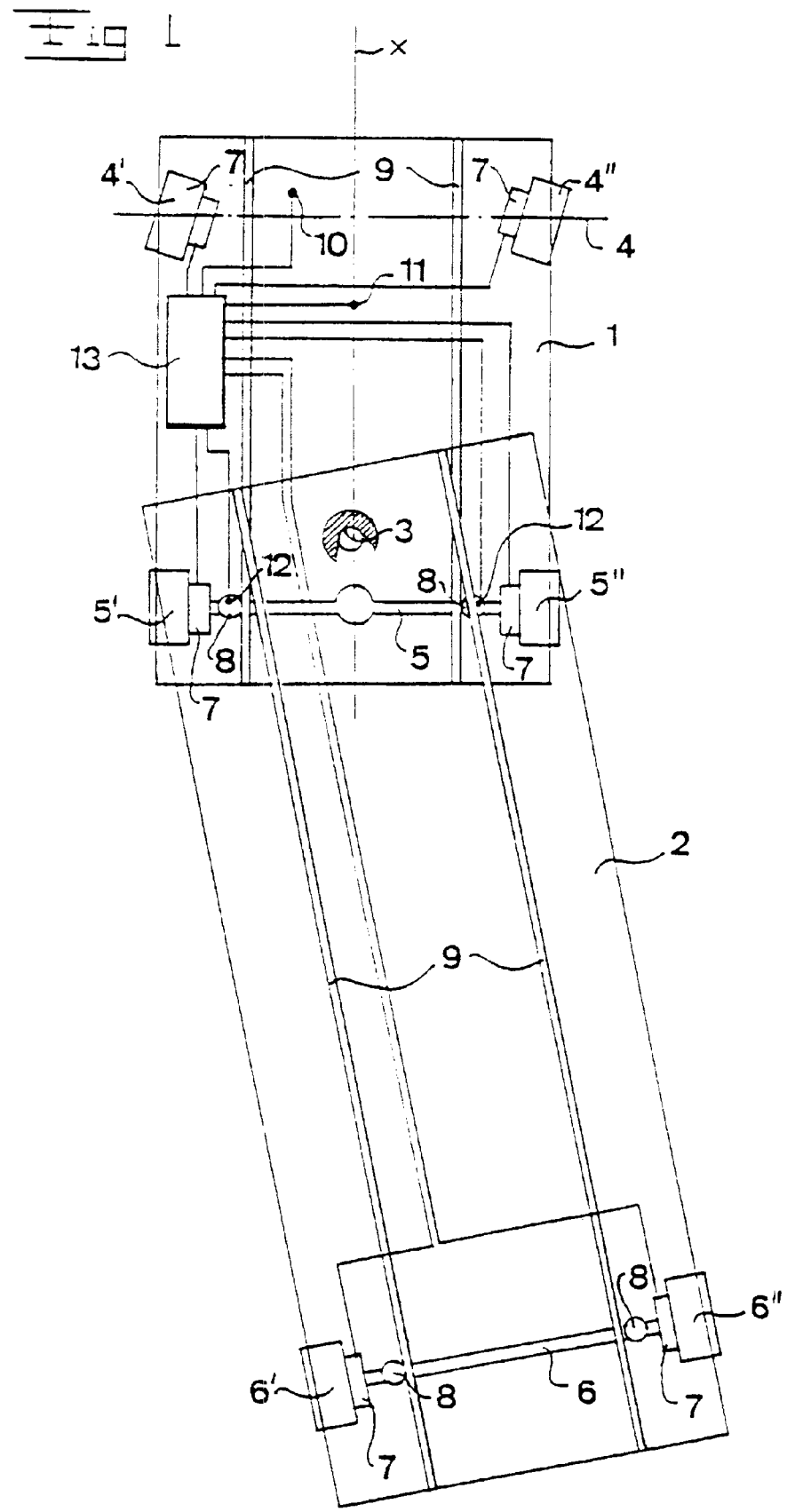
FIG. 1 shows a schematic view from above of a vehicle with a device according to a first embodiment of the invention.

FIG. 1 shows a vehicle in the form of a truck comprising a tractor vehicle 1 and a trailer 2 which is connected to the tractor vehicle 1 by a vehicle connection 3 which is of a type which allows the vehicles 1, 2 to swivel relative to one another in a substantially horizontal plane. The tractor vehicle 1 incorporates a front wheel axle 4 with a first wheel 4' on the left side of the vehicle 1 and a second wheel 4" on the right side of the vehicle 1. The tractor vehicle 1 also incorporates a rear wheel axle 5 with a left wheel 5' and a right wheel 5". The tractor vehicle 1 may also be equipped with further rear axles. The trailer 2 incorporates a wheel axle 6 which is arranged in the rear end of the trailer 2 and which incorporates a left wheel 6' and a right wheel 6". The trailer 2 may also be equipped with further wheel axles. The drive of the vehicles 1, 2 is effected, as indicated in FIG. 1, via the wheel axle 5, i.e. via the rear wheels 5' and 5" of the tractor vehicle 1. The vehicles 1, 2 also incorporate means of speed reduction which in the example depicted include a braking device 7 arranged on each wheel. The vehicles 1, 2 further incorporate two suspension elements 8 in the form of gas springs arranged on each of the rear wheel axles 5, 6. It should be noted that other types of suspension device, other than the aforesaid gas springs 8 may also be used, e.g. coil springs or leaf springs, and that the front wheel axles of the vehicles 1, 2 may also be provided with suspension elements despite the latter not being shown in the drawings. The suspension elements 8 of the vehicles 1, 2 are suspended in frameworks 9 of the tractor vehicle 1 and the trailer 2. The frameworks 9 extend in a longitudinal direction x which essentially coincides with the normal course of the vehicles 1, 2 when moving straight ahead.

According to the present invention, the tractor vehicle 1 incorporates a steering angle sensor 10 which detects the deflection of the steering wheel and can therefore provide a measure of the intended course or direction of movement of the vehicle. The tractor vehicle 1 also incorporates a yaw rate sensor 11 or a sensor which detects the vehicle's lateral acceleration. The yaw rate sensor 11 thus makes it possible to have a measure of the actual course or direction of movement of the vehicles 1, 2. The tractor vehicle 1 also incorporates two pressure detectors 12, each of them situated in its respective gas suspension element 8 on the wheel axle 5, which are arranged to detect the pressure in those elements and hence provide a measure of the ground pressure on the two wheels 5' and 5". The sensors 10, 11, 12 are all connected to a control unit 13 which is itself connected, by a separate connection, to each of the braking devices 7.

Figure 2:
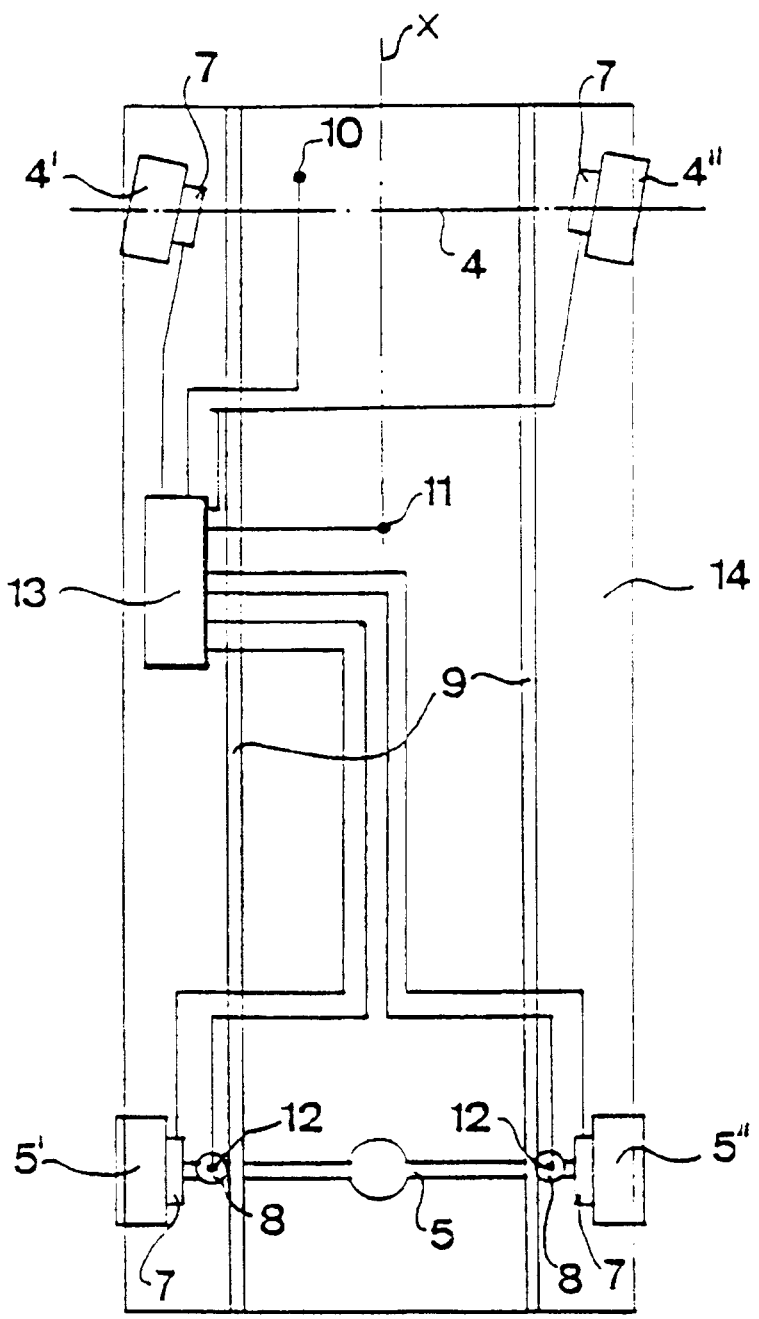
FIG. 2 shows a schematic view from above of a vehicle with a device according to a second embodiment of the invention.
Figure 3:
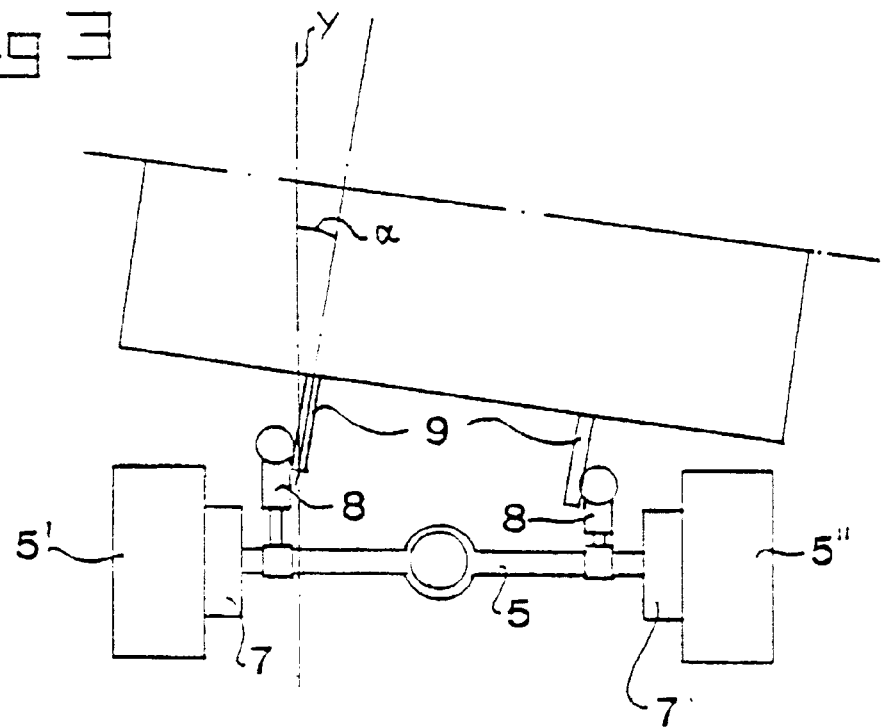
FIG. 3 shows a view from the rear of the vehicle in FIG. 2.

FIG. 2 shows a vehicle 14 according to another embodiment of invention in the form of a truck, a bus or the like. The vehicle 14 differs from the vehicle according to the first embodiment in that the vehicle 14 does not include a trailer vehicle. It otherwise incorporates the same components as in the first embodiment. FIG. 3 shows a view from the rear of the vehicle in FIG. 2. FIG. 3 illustrates how the vehicle body and framework 9 may lean at an angle α relative to a vertical axis y.

Figure 4:
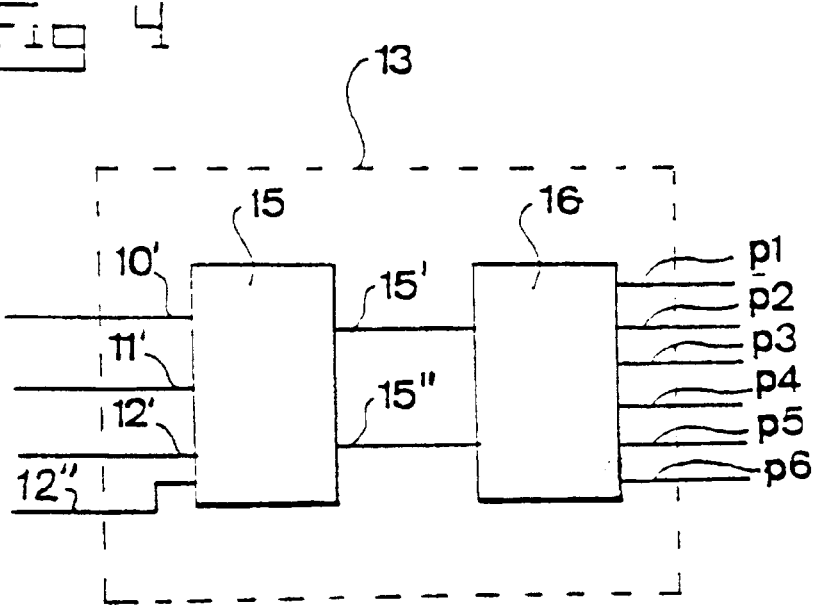
FIG. 4 shows schematically the structure of a control unit of the device according to the invention.

FIG. 4 shows schematically the structure of the control unit 13. The latter incorporates a processor unit 15 and a distribution unit 16 which includes a so-called distribution matrix. The processor unit 15 has four inputs, comprising a first input 10' for the steering angle sensor 10, a second input 11' for the yaw rate sensor 11 and third and fourth inputs 12', 12" for the two pressure sensors 12, so that it is possible to determine the difference between the two ground pressures, thereby providing an indication of the vehicle's angle of inclination. The processor unit 15 also has two outputs 15' and 15" which are connected to the inputs of the distribution unit 16 and are arranged respectively to emit uniform and non-uniform braking signals to the distribution unit, as explained in more detail below. The distribution unit 16 has six outputs p1, p2, p3, p4, p5, p6. If the vehicle has more than the three depicted axles, the number of outputs is increased by two for each further axle. Each of these outputs is connected to one of the braking devices 7 for the emission of a brake pressure signal to each of the braking devices 7.

The device according to the invention functions as follows. If the vehicles 1, 2, 14 lean to the angle α, the ground pressure will be different on their left and right side depending on which way they lean. If the difference between these ground pressures exceeds a predetermined value, which means that the angle of inclination α also exceeds a certain value, the processor unit 15 will respond to the value of the parameter monitored by emitting to the distribution unit 16 via the output 15' a first braking signal which will be uniform, i.e. the distribution unit will emit a first brake pressure signal which is substantially equal for each wheel on the respective wheel axle. The braking force may of course nevertheless differ between the various wheel axles according to conventional technology. At the same time the processor unit 15 will emit a unilateral second braking signal via the output 15" to the distribution unit 16 in response to the difference between the intended yaw rate calculated on the basis of the steering angle signal detected by the steering angle sensor 10 and the actual yaw rate detected by the yaw rate sensor 11. This second braking signal will be superimposed on the first. This superimposition is preferably such that the braking force on one side of the vehicles 1, 2, 14 corresponds to the braking force resulting from the first braking signal alone plus essentially half of the braking force resulting from the second braking signal alone, while the braking force exerted on the other side of the vehicles corresponds to the braking force resulting from the first braking signal alone minus essentially half of the braking force resulting from the second braking signal alone. The speed of the vehicles 1, 2, 14 will thus be reduced and the risk that the detected ground pressure difference, i.e. the angle of inclination, might lead to tilting will be diminished, while at the same time maintaining the intended course of the vehicle. If a state of deviation from course is identified because the intended yaw rate calculated on the basis of the steering angle signal detected by the steering angle sensor 10 deviates more than a predetermined threshold value from the yaw rate detected by the yaw rate sensor 11, the processor unit 15 will only emit a unilateral braking signal via the output 15" to the distribution unit 16. The distribution unit 16 will thereupon emit a brake pressure signal to one side of the vehicles 1, 2, 14 so as to bring them back to the intended course.

The present invention is not limited to the embodiments indicated above but may be varied and modified within the scope of the patent claims set out below.

It should be noted that the angle of inclination α may be determined in many different ways, e.g. by means of a distance measuring element which measures the suspension position or the distance between the wheel axle 5 concerned and the framework 9. Other types of detector may also be involved, e.g. extension detectors in cases where the vehicle is equipped with leaf spring elements.

On vehicles with trailers it is also possible for the detectors for determining their angle of inclination to be arranged on the wheel axle 6 of the trailer vehicle 2.

The invention is also applicable to other types of vehicle combinations, e.g. tractor vehicles with two trailers, trucks with trailer vehicles, so-called concertina buses, etc.

What is claimed is:

1. A device for controlling speed reduction of a vehicle dependent upon a measured value, the device comprising:
   a vehicle having a frame that extends in a longitudinal direction that essentially coincides with the normal direction of movement of the vehicle, the vehicle having at least two wheel axles and at least two wheels on at least one of the axles;
   a detector for detecting a first value in a vertical direction of the vehicle frame to detect tilt of the frame, the detector being adapted to detect the ground pressure on each of the two wheels on the at least one wheel axle and to detect the difference between the ground pressures on the two wheels as the first value;
   a vehicle speed reducing device connected to the two wheels on the at least one axle;
   a control unit for receiving a signal from the detector as to the first value and for sending a signal to the vehicle speed reducing device for operating the vehicle speed reducing device on the moving vehicle to counteract the tilt of the frame, the control unit being operable to operate the vehicle speed reducing device for the two wheels on the at least one axle so that a first substantially equal speed reducing force is applied to each wheel on the at least one axle in response to the first value detected by the first detector.

2. The device of claim 1, further comprising a device in the vehicle for the setting a desired course and longitudinal direction for the vehicle;
   a second detector for detecting a second value corresponding to the deviation of the vehicle longitudinal direction from the desired course;
   the control unit also receiving a signal from the second detector as to the second value and for sending a signal to the vehicle speed reducing device in response to an identified deviation of the vehicle from its desired course for restoring the vehicle direction toward the direction of its desired course.

3. The device of claim 2, wherein the control unit sends a signal to the vehicle speed reducing device for applying a second speed reducing force non-uniformly to the wheels on the at least one axle in response to the signal received by the control unit as to the second detected value.

4. The device of claim 3, wherein the control unit sends a signal to the vehicle speed reducing device to non-uniformly apply the second speed reducing force at each of the wheels on the at least one axle when the first value exceeds a predetermined threshold value.

5. The device of claim 3, wherein the control unit is operable for sending a signal to the vehicle speed reducing device so that the second speed reducing force is superimposed on the first speed reducing force in response to the first and second values being monitored by the first and second detectors.

6. The device of claim 5, wherein the second detector for detecting the second value comprises a first sensor for detecting a desired course of the vehicle and a second sensor for detecting the actual course of the vehicle; and the control unit receiving signals from the first and second sensors for identifying the second value corresponding to the deviation of the vehicle longitudinal direction from the desired course by comparing the detected actual course with the detected desired course.

7. The device of claim 2, wherein the control unit is connected with the speed reducing device for activating the speed reducing device when one of the first and second values detected by one of the first and second detectors exceeds a predetermined value.

8. The device of claim 3, wherein the speed reducing device comprises a brake at each wheel on the at least one axle.

9. The device of claim 8, wherein the control unit comprises a processor adapted for emitting a first signal corresponding to the first speed reducing force and a second signal corresponding to the second speed reducing force, and further comprises a distribution unit for activating each of the brakes in response to the first and second signals.

10. The device of claim 9, wherein the first signal is dependent on the signal received from the first detector and the second signal is dependent on the signal received from the second detector.

11. A device for controlling speed reduction of a vehicle dependent upon a measured value, the device comprising:
   a vehicle having a frame that extends in a longitudinal direction that essentially coincides with the normal direction of movement of the vehicle, the vehicle having at least two wheel axles and at least two wheels on at least one of the axles;

a first detector for detecting a first value in a vertical direction and substantially transverse to the longitudinal direction of the vehicle;

a device in the vehicle for the setting a desired course and longitudinal direction for the vehicle;

a second detector for detecting a second value corresponding to the deviation of the vehicle longitudinal direction from the desired course;

a vehicle speed reducing device connected to the two wheels on the at least one axle and comprising a brake at each wheel on the at least one axle;

a control unit for receiving a signal from the detector as to the first value and for sending a signal to the vehicle speed reducing device for operating the vehicle speed reducing device on the moving vehicle to counteract the tilt of the frame, the control unit being operable to operate the vehicle speed reducing device for the two wheels on the at least one axle so that a first substantially equal speed reducing force is applied to each wheel on the at least one axle in response to the first value detected by the first detector;

the control unit also receiving a signal from the second detector as to the second value and for sending a signal to the vehicle speed reducing device in response to an identified deviation of the vehicle from its desired course for restoring the vehicle direction toward the direction of its desired course;

the control unit also sends a signal to the vehicle speed reducing device for applying a second speed reducing force non-uniformly to the wheels on the at least one axle in response to the signal received by the control unit as to the second detected value;

the control unit comprises a processor adapted for emitting a first signal corresponding to the first speed reducing force and a second signal corresponding to the second speed reducing force, and further comprises a distribution unit for activating each of the brakes in response to the first and second signals; and the distribution unit is adapted to activate the brake of one of the wheels on the at least on axle with the first force plus half of the second force and to activate the brake on the other wheel on the at least one axle with the first force minus half of the second force.

12. A device of claim 1, wherein there is respective suspension element at each side of the vehicle connected with the at least one wheel axle toward each side of the vehicle; and the first detector comprises first and second pressure detectors arranged at the respective suspension elements at each side of the vehicle at the at least one axle.

13. The device of claim 2, wherein the detector comprises a distance measuring device for measuring the angle between a direction transverse to the longitudinal direction and the center line of the at least one wheel axle as the first value being measured.

14. The device of claim 1, wherein the vehicle has a rear axle and an axle forward of the rear axle and the first detector detects the first value for the vehicle rear axle.

15. The device of claim 14, wherein the vehicle comprises a tractor and a trailer which are attached with the trailer behind the tractor, the trailer including a wheel axle and the tractor including a plurality of wheel axles, the rear axle being the rear axle on the tractor and the first detector detecting the first value with respect to the rear axle of the tractor.

* * * * *